United States Patent [19]

Tsuchiya et al.

[11] Patent Number: 4,499,774

[45] Date of Patent: Feb. 19, 1985

[54] SEMICONDUCTOR PRESSURE TRANSDUCER

[75] Inventors: Masatoshi Tsuchiya; Ko Soeno, both of Hitachi; Tomomasa Yoshida, Mito, all of Japan

[73] Assignee: Hitachi, Ltd., Tokyo, Japan

[21] Appl. No.: 284,340

[22] Filed: Jul. 17, 1981

[30] Foreign Application Priority Data

Jul. 18, 1980 [JP] Japan .................. 55-97537

[51] Int. Cl.³ .............................. G01L 9/06
[52] U.S. Cl. ................... 73/727; 228/263.13; 338/4
[58] Field of Search .......... 73/721, 727, 754, DIG. 4; 75/123 K; 148/31; 228/263 A, 263 B, 232, 173 R, 173 F; 65/40; 338/4, 42

[56] References Cited

U.S. PATENT DOCUMENTS

| | | | |
|---|---|---|---|
| 2,217,421 | 10/1940 | Scott | 75/123 K X |
| 2,677,877 | 5/1954 | Cox | 228/263 A X |
| 2,941,882 | 6/1960 | Franklin et al. | 148/31 X |
| 3,384,399 | 5/1968 | Davies et al. | 75/123 K |
| 3,974,000 | 8/1976 | Henmi et al. | 75/123 K X |
| 4,019,388 | 4/1977 | Hall et al. | 73/754 |
| 4,166,384 | 9/1979 | Tsuchiya et al. | 73/777 |
| 4,264,889 | 4/1981 | Yamamoto et al. | 73/721 X |
| 4,303,903 | 12/1981 | Matsuoka et al. | 338/4 |
| 4,314,225 | 2/1982 | Tominaga et al. | 73/721 X |
| 4,321,578 | 3/1982 | Nagasu et al. | 73/721 X |
| 4,342,231 | 8/1982 | Yamamoto et al. | 73/721 |

OTHER PUBLICATIONS

Kurtz et al., "A Solid State Bonding and Packaging Technique for Integrated Sensor Transducers", ISA ASI 73246 (1973), 229-238.

Primary Examiner—Gerald Goldberg
Assistant Examiner—John E. Chapman, Jr.
Attorney, Agent, or Firm—Antonelli, Terry & Wands

[57] ABSTRACT

A semiconductor pressure transducer comprising a piezoresistive semiconductor diaphragm, a cylindrical stem made of a glass having a thermal expansion coefficient approximating that of the diaphragm and hermetically bonded by anodic bonding to the latter, and a cylindrical holder hermetically bonded by anodic bonding to the cylindrical stem is disclosed. The holder is made of a ferromagnetic alloy material containing Fe, Co and Ni and having a mean thermal expansion coefficient of $35 \times 10^{-7}/°C.$ or less within the temperature range between 30° C. and 350° C.

8 Claims, 4 Drawing Figures

SEMICONDUCTOR PRESSURE TRANSDUCER

BACKGROUND OF THE INVENTION

The present invention relates to a semiconductor pressure transducer incorporating a semiconductor diaphragm and, more particularly, to a semiconductor pressure transducer of the type mentioned above having an improved strength of bonding between a glass stem of a low thermal expansion coefficient in support of the semiconductor diaphragm and a holder of the glass stem.

Semiconductor pressure transducers employing a semiconductor diaphragm are disclosed, for example, in the specification of the U.S. Pat. No. 4,019,388. In the pressure transducer in this U.S. Patent specification, a silicon diaphragm in which a piezoresistance is formed is bonded by eutectic reaction by means of a solder material to a tubular holder or stem made of a borosilicate glass (7740 Pyrex). This glass holder or stem in turn is soldered to 39-42% Ni-Fe holder.

Recently, it has been proposed and actually carried out to effect the bonding between the silicon diaphragm and the glass stem and between the glass stem and the holder by anodic bonding. Such an anodic bonding is embodied, for example, in "PRESSURE TRANSDUCER" disclosed in the specification of U.S. patent application Ser. No. 81,372 filed on Oct. 3, 1979 now U.S. Pat. No. 4,321,578, assigned to the same asignee as the present application.

Also, there is a disclosure concerning the anodic bonding (or electrostatic bonding) in transducer, in an article entitled "A SOLID STATE BONDING AND PACKING TECHNIQUE FOR INTEGRATED SENSOR TRANSDUCER" (ISA ASI 73246 (229-238) 1973). According to this bonding technique, it is possible to bond two members without using any adhesive or bonding agent. In this case, however, it is essential that the materials of two members have similar thermal expansion coefficient. Usually, a borosilicate glass (for example, Pyrex glass 7740, made by Corning Glass Works) having a thermal expansion coefficient approximating that of Si is used as the material of the glass stem, while an alloy of Fe-40%Ni system is used as the material of the holder. In the pressure transducer having this construction, it is necessary that all joint parts are bonded in a gas-tight manner and at a high bonding strength, without leaving substantial residual strain after the bonding.

At temperatures below about 300° C., the Pyrex glass and the Fe-40%Ni alloy exhibit approximately same thermal expansion ratio. More specifically, the Pyrex glass and the Fe-40% Ni alloy exhibit mean thermal expansion coefficient ranging between $32 \times 10^{-7}/°C.$ and $34 \times 10^{-7}/°C.$ at a temperature range between 30° and 300° C. As the temperature at the juncture comes down below 270° C., the performance or characteristic of the glass as an electrolyte is suppressed to reduce the bonding strength. Therefore, the anodic bonding is usually conducted at a temperature between 280° C. and 300° C. Thus, the use of the Ni—Fe alloy restricts the range of bonding temperature. Because of a slight change in the thermal expansion coefficient of the holder material, if the bonding is made at such a temperature that the holder material exhibits a larger thermal expansion ratio than the Pyrex glass, a large stress remains in the Pyrex glass after the bonding often resulting in cracking in the Pyrex glass. Thus the above-mentioned combination of materials permits a leak of gas at the juncture and disadvantageously decreases the bonding strength. Therefore, such a combination cannot be successfully used in the semiconductor pressure transducer which requires a high precision of bonding.

SUMMARY OF THE INVENTION

Accordingly, a first object of the invention is to provide a semiconductor pressure transducer which permits an elevation in temperature of the anodic bonding between the glass stem having a low thermal expansion coefficient and the holder.

A second object of the invention is to provide a semiconductor pressure transducer having a combination of the glass stem and the holder material capable of maintaining substantially similar thermal expansion coefficients of these materials over a wide range of temperature.

A third object of the invention is to provide a holder material which permits an efficient preparatory work for the anodic bonding.

A fourth object of the invention is to provide a holder material which can provide a good condition of welding between the holder and a retainer by which the holder is retained.

To these ends, according to the invention, there is provided a semiconductor pressure transducer comprising a piezoresistive diaphragm, a cylindrical stem of a glass having a small thermal expansion coefficient, the diaphragm being hermetically bonded by anodic bonding to one side of the cylindrical stem, and a cylindrical holder for introducing a pressurized fluid to the diaphragm through the cylindrical glass stem and hermetically bonded by anodic bonding to the other side of the glass stem to support the latter, wherein the holder is made of a ferromagnetic alloy having an austenitic structure and containing Fe, Co and Ni and exhibiting a mean thermal expansion coefficient of $35 \times 10^{-7}/°C.$ or less over a temperature range between 30° C. and 400° C.

The above and other objects, as well as advantageous features of the invention, will become clear from the following description of the preferred embodiments taken in conjunction with the accompanying drawings.

DESCRIPTION OF THE PREFERRED EMBODIMENTS

Figure 1:
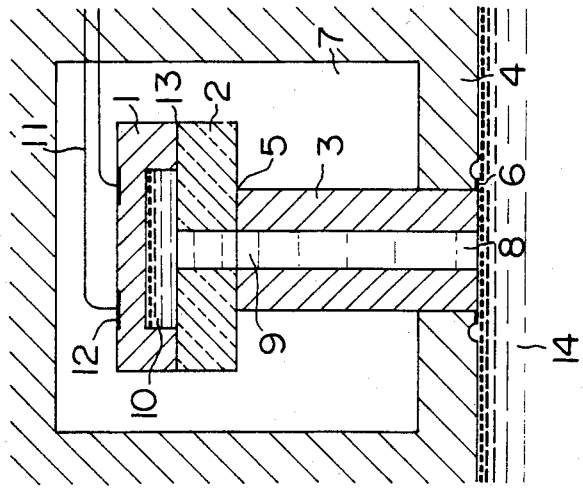
FIG. 1 is a sectional view of an essential part of a semiconductor pressure transducer constructed in accordance with an embodiment of the invention.

Referring first to FIG. 1 showing in section an essential part of a semiconductor pressure transducer of the invention, a silicon diaphragm 1, made of, e.g., a piezoresistive silicon single crystal has a highly smoothly finished peripheral portion which is bonded by anodic bonding to one side of a cylindrical stem 2. The cylindrical stem 2 is made of a glass having a small thermal expansion coefficient, particularly a borosilicate glass having a thermal expansion coefficient approximating that of the silicon. A typical example of such a borosilicate glass is 7740 Pyrex sold from Dow Corning Glass Works. The detail of the anodic bonding is not described here because this technique is known per se. For information, if necessary, a reference shall be made to the aforementioned literature "A SOLID STATE BONDING AND PACKING TECHNIQUE FOR INTEGRATED SENSOR TRANSDUCER".

For attaining a high quality of the anodic bonding, it is necessary to highly smoothly finish also the surface 13 of the stem 2. Subsequently, the cylindrical holder 3 is bonded by anodic bonding to the other side 5 of the stem 2. Piezoresistive zones 12 are formed in the silicon diaphragm 1 by a boron diffusion, so that a change in electric resistance is derived in accordance with the deflection of the diaphragm through leads 11.

The assembly thus constructed is placed in a cavity 7 in a base 4. The outer peripheral edge of the holder 3 is jointed to the brim of the bore formed in the base 4 by a TIG welding at 6. The cavity 7 in the base 4 is filled with a fluid such as a silicon oil.

The liquid 8 to be measured or a pressure transmitting medium liquid which transmits the pressure of the liquid 14 to be measured is introduced to the hollow back side of the diaphragm 1, through the hollow 8 of the cylindrical holder 3 and the hollow 9 of the glass stem 2, thereby to transmit the pressure to the back side of the diaphragm 1.

As stated before, in the pressure transducer of the invention, the silicon diaphragm and the glass stem exhibit thermal expansion coefficients approximating each other, in order to avoid breakage of the silicon diaphragm and/or glass stem due to a thermal stress which may otherwise be caused during the anodic bonding. For the same reason, it is necessary to make the thermal expansion coefficient of the holder approximate that of the glass stem 2. If this approximation in thermal expansion coefficients is obtainable only within a limited range of temperature, the anodic welding work is restricted correspondingly and the reliability of the bond obtained becomes reduced. For instance, assuming here that the approximation of the thermal expansion coefficients of the holder and the glass stem is obtainable only at a temperature range of below 270° C., the anodic bonding has to be carried out at a temperature of below 270° C. In that case, since the performance or characteristic of the glass as an electrolyte is low, the bonding strength becomes insufficient. To the contrary, assuming that the holder exhibits a thermal expansion coefficient approximating that of the glass only at a high temperature, e.g. 400° C., and that the anodic bonding is effected at this temperature, it is the case that the bonding may be broken after the cooling due to the thermal stress generated in the course of the temperature rise to 400° C.

From this point of view, the present inventors have made a comparison of the thermal expansion ratios between the 7740 Pyrex glass and Fe-40%Ni alloy, which has been widely used as the material of the holder, over a wide range of temperature. As a result, it proved that the thermal expansion coefficient of the Fe-40%Ni alloy well approximates that of the 7740 Pyrex glass at a temperature of around 280° C., and that, as this temperature is exceeded, the thermal expansion ratio Fe-40% Ni alloy is drastically increased beyond that of the 7740 Pyrex glass. It can be appreciated that a highly reliable bonding will be achieved if the holder is made of a material which would exhibit a thermal expansion coefficient approximating to that of the glass at a high temperature of above 280° C., particularly above 350° C. at which the glass functions well as an electrolyte, because such a material permits a satisfactory anodic bonding at a temperature of above 350° C.

The present inventors have worked out a holder made of an Fe—Ni—Co alloy which exhibits a mean thermal expansion coefficient of below $35 \times 10^{-7}$/°C. at a temperature ranging between 30° and 400° C., and conducted an anodic bonding of this holder to the 7740 Pyrex glass. The result was quite superior and excellent.

The above-mentioned Fe—Ni—Co alloy has a Curie point of above 300° C. Thus, a drastic change (increase) in the thermal expansion ratio appears at a temperature of above 300° C.

The alloy material suitably used as the material of the holder in the invention is a ferromagnetic alloy containing 27.5 to 32 wt% of Ni, 11.5 to 16.5 wt% of Co and the balance, particularly 45 to 77 wt%, of Fe, with additives added as required, and having been subjected to a cold working of 30% or higher and an annealing to exhibit a mean thermal expansion coefficient of $3.5 \times 10^{-6}$/°C. at a temperature range between 30° C. and 400° C.

The present inventors noticed a fact that, by subjecting the Fe—Ni—Co alloy to a cold working and an annealing, it is possible to obtain grain-refined structures to remarkably decrease the thermal expansion coefficient, and also that the transition point of the thermal expansion ratio is shifted to the higher temperature side as the result of the cold working and the annealing.

Figure 2:
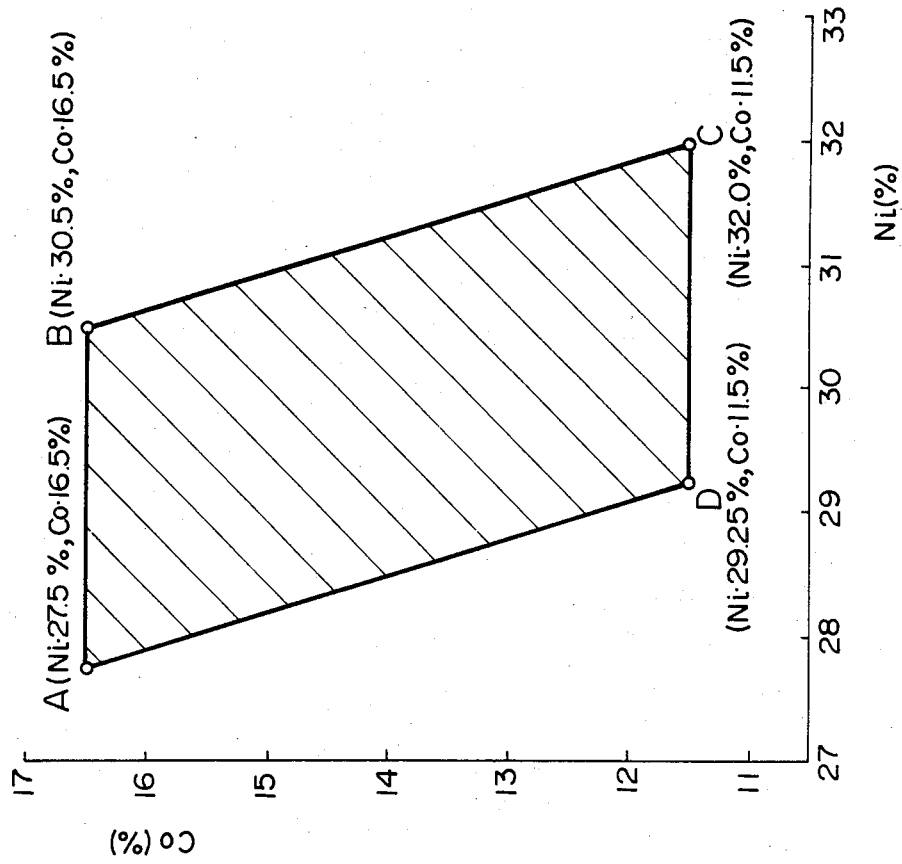
FIG. 2 is a diagram showing an alloy composition specifically useful as the material of a holder in the invention.

The inventors have made various experiments and intense study to obtain a composition of the Fe—Ni—Co alloy which would provide a mean thermal expansion coefficient of below $35.0 \times 10^{-7}$/°C. at a temperature range between 30° and 300° C. Samples were selected and prepared to fall within a composition range defined, as shown in FIG. 2, by point A (Ni: 27.5%, Co: 16.5%), point B (Ni: 30.5%, Co: 16.5%), point C (Ni: 32.0%, Co: 11.5%) and point D (Ni: 29.25%, Co: 11.5%). It proved that materials having low mean thermal expansion coefficient of less than $35 \times 10^{-7}$/°C. are obtainable by subjecting these sample materials to a 30 to 90% cold working and then to a stress relief annealing at 200° to 600° C. In practice, if the aforesaid composition contains less than 0.1% of C, less than 0.5% of Si and less than 2.0% of Mn, as well as unavoidable impurities, the objects of the invention can be fully accomplished.

Referring to FIG. 2, in the composition range of lower Ni and Co contents than the line connecting points A and D, a martensite transformation occurs in the course of cooling from the perfect annealed condition, to increase the thermal expansion coefficient. Thus, the composition in this range cannot be used practically. The mean thermal expansion coefficient of less than $35 \times 10^{-7}$/°C. over a temperature range between 30° and 350° C. cannot be obtained also in other composition ranges.

No substantial effect of cold working is obtained when the degree of cold working such as rolling, drawing, extrusion, swaging and so forth is less than 25%, and in some compositions a transformation of grain structure from austenite to martensite occurs when the degree of cold working exceeds 90%, resulting in an abrupt increase in the mean thermal expansion coefficient at a temperature range between 30° and 350° C. The degree of cold working, therefore, preferably falls within the range between 50 and 70%. The annealing subsequent to the cold working should be conducted at a temperature of below the recrystallization temperature, preferably between 200° C. and 600° C. An annealing temperature of below 190° C. cannot provide a sufficient annealing effect and causes a deformation of the holder at the time of anodic bonding. Such a low annealing temperature, therefore, is not suitable.

An explanation will be made hereinunder as to the maximum allowable contents of elements which are unavoidably introduced in the course of the production, as well as to the maximum allowable contents of elements which are added as deoxidizer and desulfurizer.

The use of D as a strong deoxidizer is necessary to improve the cleanliness of the material. However, increase in the C content incurs an undesirable increase in the thermal expansion coefficient and, accordingly, the C content should be controlled below 0.1%. Also, the Si which is used as a deoxidizer should be limited to a value of below 0.5%. An increase in the Si content leads to a reduction in toughness. Mn can be used as the desulfurizer. The Mn content, however, should be limited to a level of below 2.0%, because an increase in the Mn content causes increase in the thermal expansion coefficient. P and S act to lower the toughness of the material. Therefore, the P+S content should be limited to a level of below 0.01%.

Figure 3:
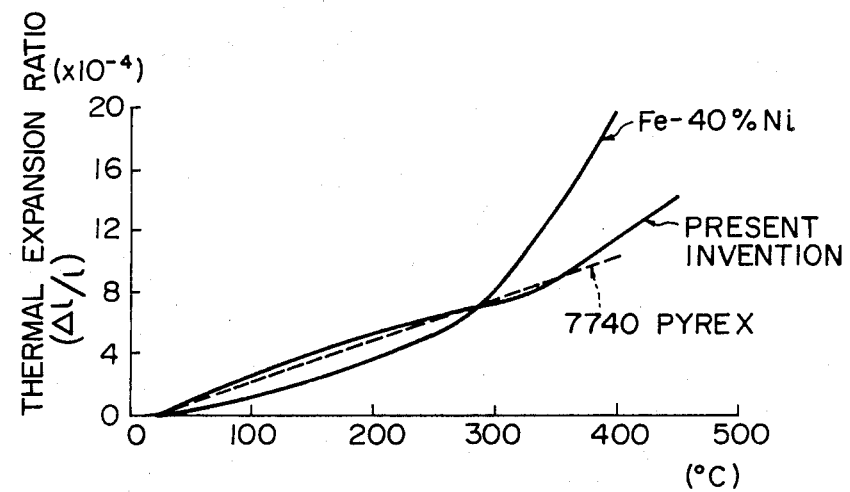
FIG. 3 is a graph showing the thermal expansion ratios of the holder material used in the invention, Fe-40%Ni material and 7740 Pyrex glass.

FIG. 3 shows a typical example of the thermal expansion curve of the holder material as used in the present invention, in comparison with that of the conventionally used material and in relation to that of the Pyrex glass. It will be seen that the Fe—Ni alloy as the conventional material exhibits a thermal expansion ratio well matching that of the Pyrex glass up to a temperature of about 280° C. However, as the temperature is increased beyond 280° C., the thermal expansion ratio of this material is drastically increased to exhibit a large difference from that of the Pyrex glass. In contrast, the holder material of the invention shows a thermal expansion ratio which well approximates that of the Pyrex glass up to a high temperature of about 350° C. This means that the anodic bonding between the Pyrex glass and the holder material of the invention can be conducted at a temperature as high as 350° C., so that the performance or characteristic of the glass as an electrolyte is enhanced to permit a strong bonding in a shorter period of time. In addition, in the holder material of the invention, the change in the transition point of thermal expansion ratio is so small that the bonding can be made in quite a stable manner without being adversely affected by deviation in thermal expansion coefficient and bonding temperature.

As will be understood from the foregoing description, the use of the holder material of the invention permits an anodic bonding of the holder to the Pyrex glass at a high temperature in the vicinity of 350° C., thereby to ensure a higher gas-tightness and bonding strength, while reducing the level of the residual strain. Thus, the present invention makes it possible to produce semiconductor pressure transducers at much reduced deviation in quality and at a higher yield over the conventional technique.

A practical example will be described hereinunder, in order to make the advantages of the invention understood fully. Using a high-frequency vacuum melting furnace, 28 Kg of sample materials were prepared with various Ni and Co contents as shown in the following Table.

|   | No. | Composition (%) | | | Mean thermal expansion coefficient between 30° C. and 350° C. ($\times 10^{-7}/°C.$) |
|---|---|---|---|---|---|
|   |   | Ni | Co | Fe |   |
| A | 1 | 40.06 | — | balance | 45.7 |
| B | 2 | 28.04 | 15.8 | balance | 35.2 |
|   | 3 | 29.21 | 15.6 | balance | 33.6 |
|   | 4 | 29.52 | 14.4 | balance | 28.7 |
|   | 5 | 30.01 | 12.8 | balance | 34.8 |
|   | 6 | 30.96 | 12.5 | balance | 34.8 |
|   | 7 | 31.68 | 12.2 | balance | 35.0 |

A: conventional material
B: material of invention

After a hot forging, the sampling materials were subjected to annealing at 900° C. for one hour and then to a cold drawing at a degree of working of 60% to produce wires of diameters ranging between 5.0 and 10 mm. The thermal expansion coefficient as measured for each sample material after having been annealed at 400° C. is shown in the above Table.

Figure 4:
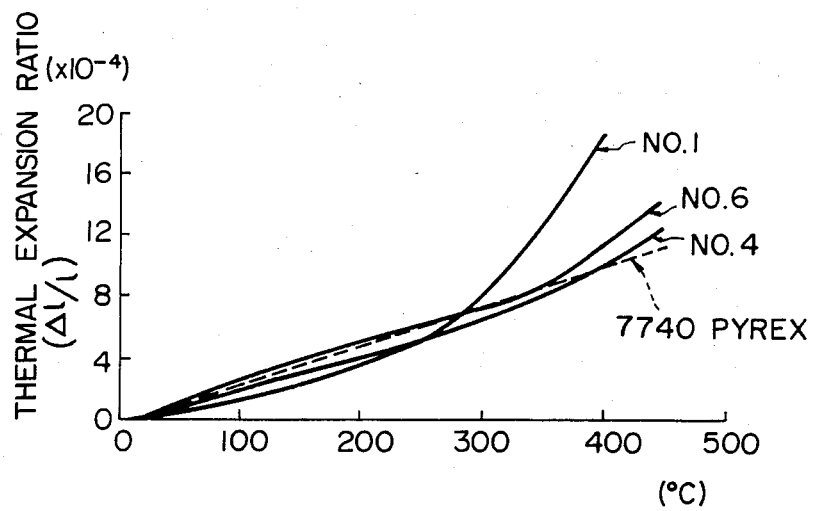
FIG. 4 is a graph showing the thermal expansion ratio of a holder material used in the embodiment and that of 7740 Pyrex glass.

It will be seen that the holder materials of the invention stably exhibit mean thermal expansion coefficient of below $35.2 \times 10^{-7}/°C.$ over the temperature range between 30° C. and 350° C. FIG. 4 shows typical examples of thermal expansion curves of the conventionally used Fe-40%Ni alloy and the holder material of the invention. Holders were produced using the material shown in FIG. 4, and were bonded by anodic bonding at 350° C. to Pyrex glass stems. All of the Pyrex glass stems bonded to the conventional alloy were broken after the bonding. In contrast, no breakage was found in the Pyrex glass stems bonded to the holders made from the material of the invention. The juncture between the Pyrex glass stem and the holders made from the materials of the invention showed a leak of helium of less than $10^{-10}$ atm CC/S, i.e. a perfect gas-tightness. It was also confirmed that the bonding strength of the pressure-receiving portion of the pressure transducer of this embodiment is greater than the rupture strength of the silicon diaphragm. The ratio of number of products bonded by anodic bonding exhibiting acceptable strength to the total number of the products was 95% or higher, which is remarkably high as compared with the ratio of 30 to 70% exhibited by the products incorporating the conventional holder material. Thus, according to the invention, it is possible to produce semiconductor pressure transducers of superior quality at much higher yield over the prior art.

What is claimed is:

1. A semiconductor pressure transducer comprising: a piezoresistive semiconductor diaphragm; a cylindrical stem made of a glass having a thermal expansion coefficient approximating that of said diaphragm, said diaphragm being hermetically bonded by anodic bonding to one side of said cylindrical stem; and a cylindrical holder for introducing a pressurized fluid to said diaphragm through said cylindrical glass stem, said cylindrical holder being hermetically bonded by anodic bonding at one end to the other side of said glass stem to support said glass stem; wherein said holder is made of a ferromagnetic alloy material having an austenitic structure and consisting essentially of Ni and Co, of which contents being within the range defined by a point A (Ni: 27.5%, Co: 16.5%), point B (Ni: 30.5%, Co: 16.5%), point C (Ni: 32.0%, Co: 11.5%) and a point D (Ni: 29.25%, Co: 11.5%) in FIG. 2, and the balance Fe, with at most small amounts of Si, Mn and C, said alloy material having been subjected to 30-90% cold working and stress relief annealing at 200°-600° C., and exhibiting a mean thermal expansion coefficient of $35 \times 10^{-7}/°C$. or less over a temperature range between 30° C. and 350° C., whereby anodic bonding up to a temperature of 350° C. can be provided for bonding said cylindrical stem and cylindrical holder without breaking of the stem.

2. A semiconductor pressure transducer as claimed in claim 1, wherein said alloy has been subjected to 50-70% cold working.

3. A semiconductor pressure transducer as claimed in claim 1, wherein said glass is a borosilicate glass.

4. A semiconductor pressure transducer as claimed in claim 3, wherein said borosilicate glass is 7740 Pyrex.

5. A semiconductor pressure transducer comprising: a diaphragm made of a piezoresistive silicon single crystal; a cylindrical stem made of a glass having a low thermal expansion coefficient approximating that of said diaphragm, said diaphragm being hermetically bonded by anodic bonding to one side of said cylindrical stem; and a cylindrical holder for introducing a pressurized fluid to said diaphragm through said cylindrical stem, said cylindrical holder being hermetically bonded by anodic bonding at its one end to the other side of said cylindrical stem to support the latter; wherein said holder is made of an austenitic ferromagnetic alloy consisting essentially of 27.5 to 32 wt% of Ni, 11.5 to 16.5 wt% of Co, 0.1 wt% or less of C, 0.5 wt% or less of Si, 2 wt% or less of Mn and incidental impurities, balance Fe, said alloy having been subjected to 30-90% cold working and stress relief annealing at 200°-600° C., and having a mean thermal expansion coefficient approximating that of said glass stem within the temperature range between 30° C. and 350° C., whereby anodic bonding up to a temperature of 350° C. can be provided for bonding said cylindrical stem and cylindrical holder without breaking of the stem.

6. A semiconductor pressure transducer as claimed in claim 5, wherein said alloy has been subjected to 50-70% cold working.

7. A semiconductor pressure transducer as claimed in claim 5, wherein said glass is a borosilicate glass.

8. A semiconductor pressure transducer as claimed in claim 7, wherein said borosilicate glass is 7740 Pyrex.

* * * * *